F. FRIEDRICH & C. H. ALLEN.

Improvement in Gates.

No. 125,947. Patented April 23, 1872.

125,947

UNITED STATES PATENT OFFICE.

FERDINAND FRIEDRICH AND CHARLES H. ALLEN, OF PLATTEVILLE, WIS.

IMPROVEMENT IN GATES.

Specification forming part of Letters Patent No. 125,947, dated April 23, 1872.

Specification describing a new and Improved Gate-Closing Apparatus, invented by FERDINAND FRIEDRICH and CHARLES H. ALLEN, of Platteville, in the county of Grant and State of Wisconsin.

Our invention consists of a long heavy bar pivoted to the gate near the bottom and a little nearer the swinging end than the hinge, and suspended at the other end from the gate-post by a chain or cord in such manner that the gravity of the bar tends to close the gate whenever it is opened.

The said bar is confined by the side of the fence, at the rear of the gate, by a bar or other device standing up by the side of the fence a sufficient distance therefrom to let said bar work freely.

Figure 1:
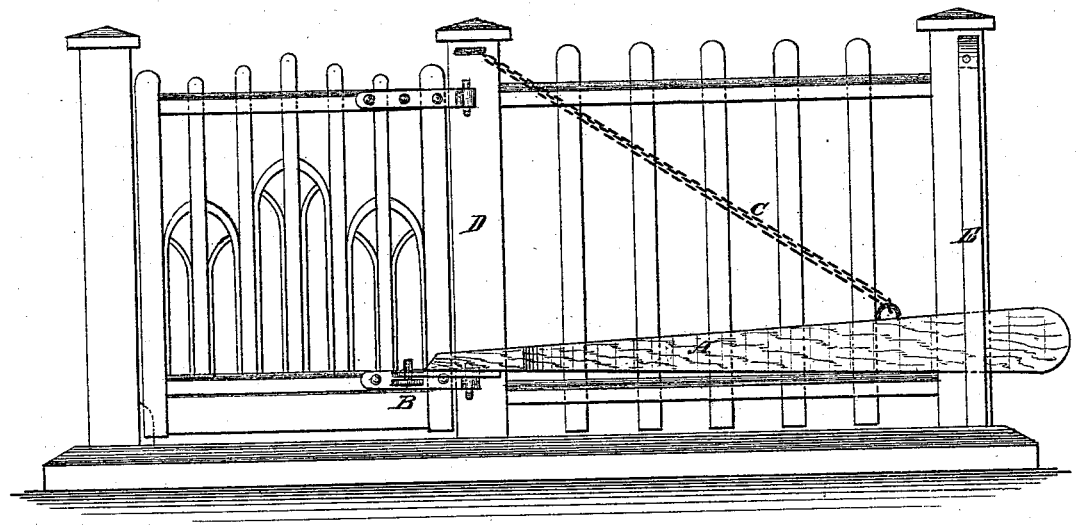
Figure 2:
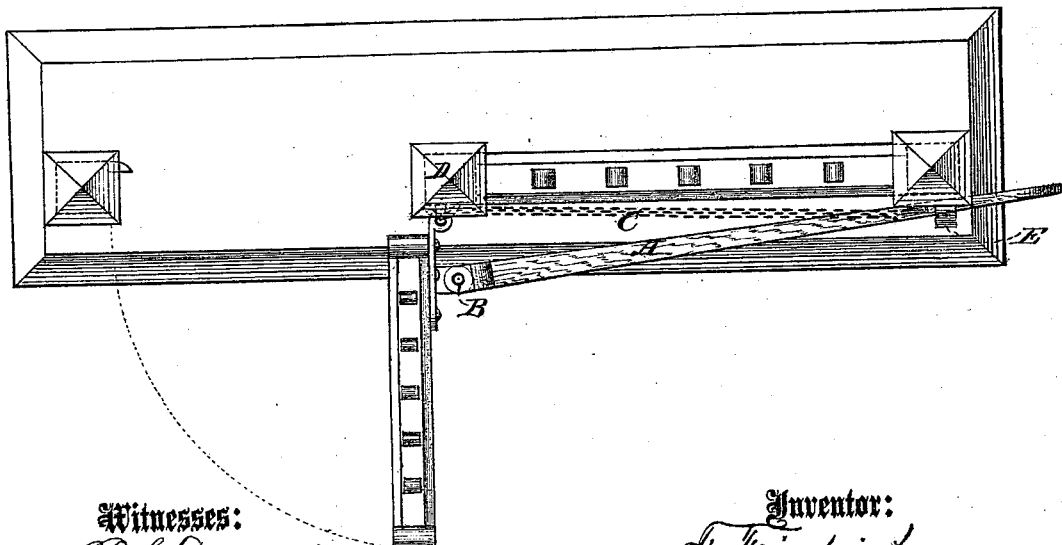

Figure 1 is a side elevation of a gate provided with our improved closing apparatus, and Fig. 2 is a top view.

Similar letters of reference indicate corresponding parts.

A is the bar, jointed to the gate by one end at B, near the lower hinge, and a little in advance of it. C is the chain by which it is suspended near the other end from the post D. E is the guard for confining the bar by the side of the fence behind the gate.

It will be seen that the weight of the bar will be mainly thrown against the gate by the chain in such direction as to close it whenever it is opened and let go. By shifting the joint B forward or back the gate will be closed with more or less force. The joint B is constructed so that the bar can be readily taken off in case it is desired to have the gate stand open.

Having thus described our invention, we claim as new and desire to secure by Letters Patent—

The combination of the bar A and a suspending cord or chain with a gate, substantially as specified.

FERDINAND FRIEDRICH.
CHAS. H. ALLEN.

Witnesses:
GEO. B. CARTER,
A. W. BARBER.